(12) United States Patent
Sjöberg et al.

(10) Patent No.: US 10,981,179 B2
(45) Date of Patent: Apr. 20, 2021

(54) FEEDING ARRANGEMENT FOR A GRANULATOR AND GRANULATOR COMPRISING SUCH A FEEDING ARRANGEMENT

(71) Applicant: Rapid Granulator AB, Bredaryd (SE)

(72) Inventors: Kurt Sjöberg, Bredaryd (SE); Magnus Blom, Värnamo (SE); Ernad Jugo, Hillerstorp (SE)

(73) Assignee: Rapid Granulator AB, Bredaryd (SE)

( * ) Notice: Subject to any disclaimer, the term of this patent is extended or adjusted under 35 U.S.C. 154(b) by 0 days.

(21) Appl. No.: 17/049,074

(22) PCT Filed: Apr. 2, 2019

(86) PCT No.: PCT/EP2019/058288
§ 371 (c)(1),
(2) Date: Oct. 20, 2020

(87) PCT Pub. No.: WO2019/206582
PCT Pub. Date: Oct. 31, 2019

(65) Prior Publication Data
US 2021/0086191 A1    Mar. 25, 2021

(30) Foreign Application Priority Data

Apr. 27, 2018    (EP) .................................... 18169906

(51) Int. Cl.
*B02C 25/00*    (2006.01)
*B02C 18/22*    (2006.01)
(Continued)

(52) U.S. Cl.
CPC ............ *B02C 25/00* (2013.01); *B02C 18/145* (2013.01); *B02C 18/148* (2013.01);
(Continued)

(58) Field of Classification Search
CPC . B02C 18/2225; B02C 18/148; B02C 18/145; B02C 18/0007; B02C 25/00
See application file for complete search history.

(56) References Cited

U.S. PATENT DOCUMENTS 4,817,877 A * 4/1989 Itoh ..................... B02C 18/0007
241/225
4,957,243 A * 9/1990 Kanagaki ............ B02C 18/0007
241/236

(Continued)

FOREIGN PATENT DOCUMENTS

| DE | 8806926 U | 9/1989 |
|---|---|---|
| DE | 19626065 A1 | 7/1997 |
| DE | 19642459 A1 | 4/1998 |

OTHER PUBLICATIONS

European Official Action (dated Aug. 8, 2018) for corresponding European App. EP 18169906.7.

*Primary Examiner* — Faye Francis
(74) *Attorney, Agent, or Firm* — WRB-IP LLP (57) ABSTRACT

An accumulation device that is operable in a feeding arrangement of a granulator, for accumulating flat material to be granulated, includes a first guiding device and a second guiding device. The accumulation device further includes a rotational shaft arranged to connect the accumulation device to the feeding arrangement. The first and the second guiding device are fixedly arranged in relation to each other so that when the accumulation device is rotated around its rotational shaft, the first guiding device as well as the second guiding device is rotated around the rotational shaft. A feeding arrangement and a granulator including such an accumulator device are also provided.

10 Claims, 6 Drawing Sheets

(51) Int. Cl.
*B29B 9/04* (2006.01)
*B29B 17/04* (2006.01)
*B02C 18/14* (2006.01)
*B02C 18/18* (2006.01)

(52) U.S. Cl.
CPC ............ *B02C 18/2225* (2013.01); *B29B 9/04* (2013.01); *B29B 17/0412* (2013.01); *B02C 2018/188* (2013.01); *B02C 2018/2208* (2013.01); *B29B 2017/044* (2013.01)

(56) References Cited

U.S. PATENT DOCUMENTS

| | | | | |
|---|---|---|---|---|
| 5,167,374 A * | 12/1992 | Strohmeyer | ........ | B02C 18/0007 241/100 |
| 5,772,129 A * | 6/1998 | Nishio | ................ | B02C 18/0007 241/30 |
| 5,884,855 A * | 3/1999 | Chang | ................ | B02C 18/0007 241/186.2 |
| 7,854,405 B2 * | 12/2010 | Adachi | ................... | B02C 23/02 241/34 |
| 8,020,794 B2 * | 9/2011 | Sued | ................ | B02C 18/2225 241/30 |
| 8,490,903 B2 * | 7/2013 | Chen | ................ | B02C 25/00 241/36 |
| 8,505,841 B2 * | 8/2013 | Davis | ................ | B02C 18/2283 241/36 |
| 8,967,510 B2 * | 3/2015 | Chen | ................ | B02C 18/0007 241/37.5 |
| 9,250,597 B2 * | 2/2016 | Tsuchihashi | ........ | B02C 18/0007 |
| 2002/0070300 A1 * | 6/2002 | McLean | ............... | B02C 18/2225 241/30 |
| 2005/0133648 A1 * | 6/2005 | Horiuchi | ................ | B65H 29/12 241/236 |
| 2010/0213297 A1 * | 8/2010 | Sued | ................ | B02C 25/00 241/36 |
| 2014/0166793 A1 * | 6/2014 | Davis | ................ | B02C 18/2283 241/36 |
| 2014/0231558 A1 * | 8/2014 | Schwelling | ......... | B02C 18/0007 241/36 |
| 2020/0316610 A1 * | 10/2020 | Chang | ................ | B02C 18/2283 |

* cited by examiner

FEEDING ARRANGEMENT FOR A GRANULATOR AND GRANULATOR COMPRISING SUCH A FEEDING ARRANGEMENT

TECHNICAL FIELD

The present disclosure relates generally to a feeding arrangement for a granulator and a granulator comprising such a feeding arrangement.

BACKGROUND

Granulators are used for handling waste e.g. from manufacturing industry, especially plastic waste, for subsequent reuse of the plastic waste. A granulator comprises a granulator mill for grinding the plastic waste into particles of approximately the same mutual size, so called granulates. The granulator mill may comprise a rotating drum, onto which periphery knives are arranged. The knives on the rotating drum co-operate with corresponding knives arranged on a static part of the mill, in order to grind, or chop, the waste into granulates.

Some granulators may also comprise feeding arrangements for feeding the plastic waste into the granulator mill so that the waste arrives at the granulator mill with a requested velocity and/or in a requested amount.

Some feeding arrangements are mainly arranged for handling flat or substantially flat waste to be granulated. For example, when plastic details are manufactured by punching the details out of a plastic sheet, the part of the plastic sheet remaining after the details have been punched out will be the flat waste to be granulated. This remaining part of the plastic sheet is to be granulated for subsequent reuse in the manufacturing industry, for example by melting the granulated part of the plastic sheet and thereafter reshaping it into e.g. new plastic sheets.

Figure 1:
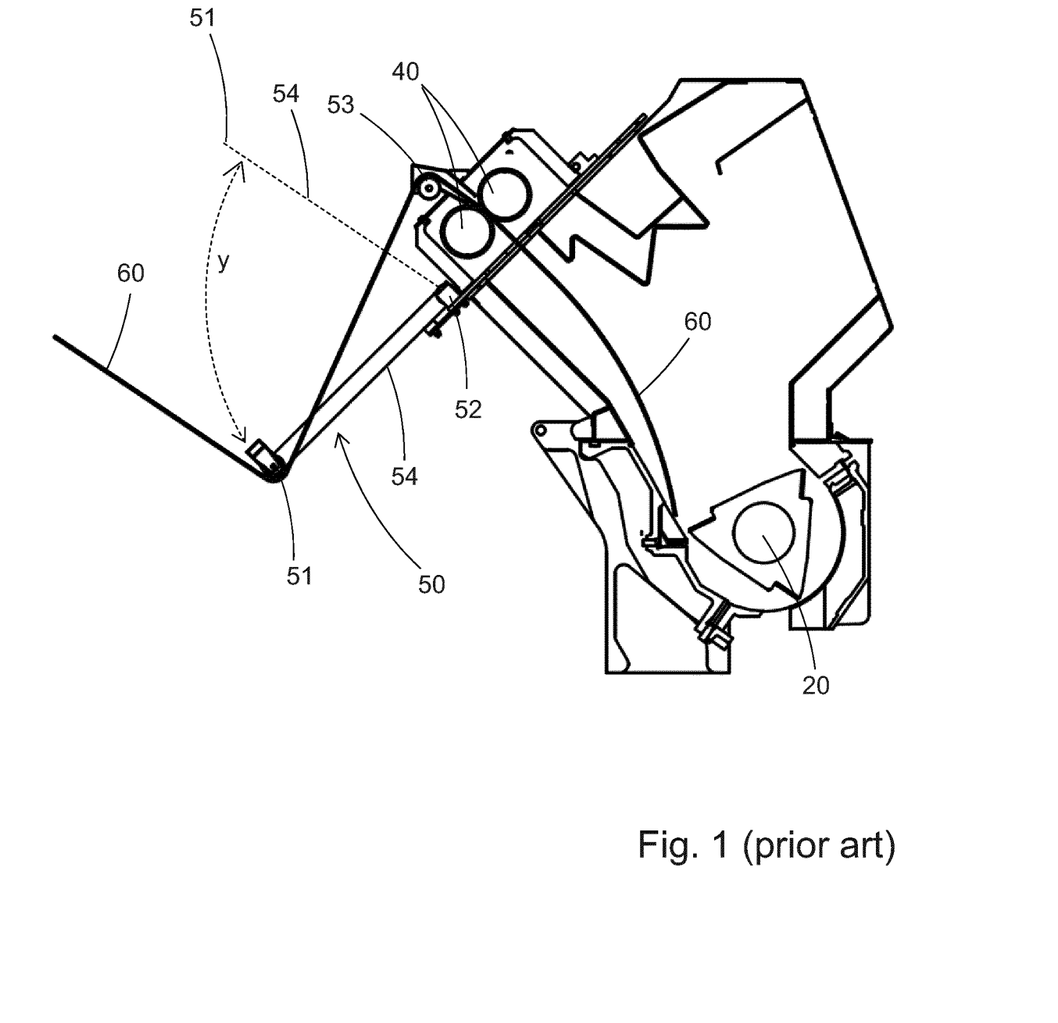
FIG. 1 is a cross-sectional side view of a granulator comprising an accumulation unit according to prior art.

A granulator comprising such a granulator feeding arrangement for substantially flat waste is shown in FIG. 1. This granulator comprises a driving unit 40 comprising a pair of rollers, in between which rollers flat waste 60 to be granulated is pulled through before it is sent into a granulator mill 20. The pair of rollers of the driving unit are to be driven so that when they rotate in order to pull the flat waste, they rotate with a certain minimum velocity so that the flat waste is driven into the granulator mill with a minimum, or optimized, feeding velocity. Hereby it is secured that the granulator mill produces granulates of a certain minimum size in order to achieve a good granulation result.

However, when the granulator is coupled to the manufacturing machine so that the plastic waste sheet goes directly from the manufacturing machine into the granulator, the driving unit may pull the waste sheet out of the manufacturing machine. If this occurs, the plastic sheet may be stretched also before the details have been punched in the manufacturing machine resulting in deformed plastic details. Such deformation in the manufacturing machine due to the granulator must be avoided.

In order to avoid such deformation, the existing granulator feeding arrangement of the applicant has an accumulation unit 50 arranged before the driving unit 40. The accumulation unit 50 is arranged to accumulate the plastic waste sheet before it is fed to the driving unit 40. Hereby, plastic sheet waste can be pulled by the driving unit 40 from the accumulation unit 50 into the granulator mill 20 only when there are plastic waste accumulated, thereby avoiding pulling the plastic sheet in the manufacturing machine. The known accumulation unit 50 of the applicant comprises a first roller or bar 51 arranged to the granulator via a rotational axis 52 distant from the first roller. The first roller 51 is connected to the rotational axis 52 via an arm 54, wherein the first roller 51 is situated at one end of the arm 54 and the first rotational axis 52 is situated near the opposite end of the arm 54 so that the position of the first roller 51 can be changed by rotating the first roller 51 around the rotational axis 52, the movement of roller 51 being marked by "y" in FIG. 1. The known accumulation unit 50 also comprises a second roller 53 arranged to the granulator via its own concentric axis. The first roller 51 and the second roller 53 have a substantially horizontal extension when the feeding arrangement is mounted on a granulator and in use. That the second roller 53 is arranged to the granulator via its own concentric axis signifies that the positon of the second roller in relation to the granulator cannot be changed. When the accumulation unit is in use, plastic sheet waste 60 received from e.g. a manufacturing machine travels via the first roller 51 and via the second roller 53 into the driving unit 40 and further into the granulation mill 20. The plastic sheet waste 60 then bears against the underside of the first roller 51 and against the upper side of the second roller 53. By moving the first roller 51 around the rotational axis 52, the position of the first roller in relation to the second roller 53 is changed. Hereby, the travelling distance that the plastic sheet waste 60 needs to travel to move from the first roller 51 to the driving unit 40 is changed. Sheet waste 60 is accumulated by making the travelling distance increase. Sheet waste is accumulated by keeping the driving unit 40 stopped as sheet waste is fed into the accumulator and by simultaneously moving the first roller 51 along "y" downwards as sheet waste is received, in order to increase the travelling distance so that sheet waste is not slacking. The first roller 51 is moved until it reaches a first end position. The first end position signifies a maximum travelling distance for the sheet waste. FIG. 1 shows the accumulation unit 50 in the first end position. When the first end position is reached for the first roller, the driving unit 40 starts pulling the sheet waste into the granulator mill 20 with a pre-set pulling velocity. As the pulling velocity normally is higher than the feeding velocity, the position of the first roller 51 is controlled so that the travelling distance in the accumulation unit is shortened in correspondence to the difference of the pulling velocity and the feeding velocity in order to avoid slack in the sheet waste as well as to avoid pulling the sheet waste from the manufacturing machine. When the first roller 51 has moved upwards and reached a second end position signifying a shortest travelling distance in the accumulation unit, the driving unit 40 is instructed to stop pulling sheet waste. The second end position of the roller 51 and the arm 54 in shown by a dashed line in FIG. 1. Now the first roller 51 is moved back towards the first end position as long as sheet waste is fed into the granulator in order to accumulate sheet waste and to avoid slack. This control of the position of the first roller 51 as well as the rate of change of position of the first roller as well as the control of the driving unit 40 may be achieved by sensors sensing the position of the first roller 51 as well as the feeding velocity of the incoming plastic sheet waste 60 and the pulling velocity of the pair of rollers of the driving unit 40.

Such an accumulation unit 50 is well-functioning. However, the position of the first roller 51 has to be continuously controlled in relation to the feeding velocity and the pulling velocity. If there is a mismatch in the position of the first roller 51 in relation to the feeding velocity and the pulling velocity of the driving unit, there is a risk that the plastic sheet will be stretched in the manufacturing machine. Alternatively, there is a risk of slack of the plastic sheet waste in the accumulation unit 50 which may cause a risk of sheet waste coming into contact with the surroundings of the machine such as the floor and hereby bring other material into the granulator that may contaminate the plastic sheet waste. Also, a considerable force has to be applied to the first roller in order to change its position, i.e. in order to move the first roller around the rotation axis from the first to the second end position. As the arm 54 and the first roller 51 has a rather large rotational radius the movement of the arm and first roller may be a risk to persons working close to the granulator so that a high security distance has to be taken, needing lots of space for the granulator.

Consequently, there is an interest in an improved accumulation function of a feeding device that is easy to control in order to avoid stretching the plastic sheet in the manufacturing machine and in order to avoid slack in the plastic sheet waste. Further, there is an interest in an accumulation function of a feeding device that can be moved between end accumulation positions with rather low force and that can perform a movement between its end accumulation positions without needing lots of space.

SUMMARY

It is an object of the invention to address at least some of the problems and issues outlined above. It is possible to achieve these objects and others by using a feeding arrangement and a granulator as defined in the attached independent claims.

According to one aspect, a feeding arrangement is provided, for feeding substantially flat material to be granulated in a feeding direction into a granulator mill. The feeding arrangement comprises a body and a driving unit arranged to the body, for pulling substantially flat material to be granulated in the feeding direction into the granulator mill. The feeding arrangement further comprises an accumulation device for accumulating substantially flat material to be granulated in the granulator. The accumulation device is arranged upstream of the driving unit so that substantially flat material to be granulated is to be fed from the accumulation device to the driving unit and further to the granulator mill. The accumulation device comprises a first guiding device for guiding and deflecting material to be granulated, the first guiding device having an extension substantially perpendicular to the feeding direction. The accumulation device further comprises a second guiding device for guiding and deflecting material to be granulated, the second guiding device having an extension substantially perpendicular to the feeding direction and at least a part of the second guiding device is arranged downstream of the first guiding device in the feeding direction. The accumulation device further comprises a rotational shaft extending substantially perpendicular to the feeding direction. Further, the first and the second guiding device are fixedly arranged in relation to each other so that when the accumulation device is rotated, the first guiding device as well as the second guiding device are rotated around the rotational shaft. The accumulation device is connected to the body via its rotational shaft.

Consequently, by arranging the accumulation device so that its first guiding device and the second guiding device are fixedly arranged to each other so that when the accumulation device is rotated, the first guiding device as well as the second guiding device are rotated around the rotational shaft, you get an automatic movement of the first guiding device as the second guiding device moves. Also, by such positioning, a much smaller force is needed for changing the accumulation distance of the accumulation unit compared to in prior art. Also, by well balancing the position of the first and second guiding devices in relation to the position of the rotation shaft, the movement could be performed even without adding any extra force. Further, such an accumulation device has a smaller moving radius, i.e. could be built more compact than the prior art accumulation device, and, consequently, the whole granulator could be arranged in a cover that is smaller than a cover needed for the prior art accumulator. Thus, a whole granulator equipped with such an accumulation device would take less space than a granulator equipped with a prior art accumulator.

The first and the second guiding device are arranged at a distance from each other. The first and second guiding device may also be arranged at a distance from the rotational shaft. The first and the second guiding device are rotationally arranged to the feeding arrangement via the rotational shaft. The driving unit may be a pair of rollers rotationally arranged to the body substantially perpendicular to the feeding direction. That at least a part of the second guiding device is arranged downstream in the feeding direction of the first guiding device signifies that material to be granulated is to be guided by the first guiding device before it is fed to and guided by the second guiding device for further feeding to the driving unit. In an embodiment where the second guiding device is elongated in the feeding direction, a part of the second guiding device that is only used when the accumulation device is in its least accumulative position has a feeding-direction position similar to the feeding-direction position of the first guiding device.

According to an embodiment, the second guiding device has a first part with a bent contact surface for deflecting the material to be granulated. The first part is arranged downstream of the first guiding device at a distance from the rotational shaft. The first part extends substantially perpendicular to the feeding direction.

According to another embodiment, the first guiding device and the first part of the second guiding device are arranged on mutually opposite sides of the rotational shaft. In other words, the rotational shaft is arranged in between the first guiding device and the first part of the second guiding device. When drawing a line from the first guiding device to the rotational shaft and further to the first part of the second guiding device, the angle at the rotational shaft between the two lines will be approximately 150-180 degrees. By such an arrangement, the accumulation device may easily be balanced in order to achieve a well-balanced device driven by the gravitational force.

According to another embodiment, the second guiding device further has a straight contact surface that in the feeding direction passes into the bent contact surface. Such a straight contact surface that extends as well in the feeding direction as perpendicular to the feeding direction would function as a support, or floor, for the material to be granulated when it is fed through the accumulation device. Such a support would be especially useful when the accumulation device is in its least accumulative position (see the detailed description) as it prevents the material to be granulated to slack downwards through the accumulation device. Further, the straight contact surface would function as a support when entering an end of a new material sheet to be granulated.

According to another embodiment, the first guiding device comprises a bar or roller extending substantially perpendicular to the feeding direction.

According to another embodiment, the first guiding device is a bar having an approximately semi-circular cross-section, wherein the bent surface of the semi-circular cross-section is positioned so that it is a contact surface for the material to be granulated. Hereby, material is saved by making the bar semi-circular instead of circular in cross-section, as the inventors have observed that only half of the surface of the bar is used for guiding and deflecting the material to be granulated.

According to another embodiment, the accumulation device further comprises a first side wall and a second side wall, the first and second side wall being parallel and extending in the feeding direction. Further, the first guiding device has a first end arranged to the first side wall and a second end arranged to the second side wall. Also, the second guiding device has a first end arranged to the first side wall and a second end arranged to the second side wall. By such first and second side walls, the first guiding device and the second guiding device are arranged to each other. Further, the first and second side walls also function as guides guiding the material to be granulated towards the driving unit along the feeding direction.

According to an embodiment, the feeding arrangement further comprises one or more position sensors for sensing a first rotation position of the accumulation device and for sensing a second rotation position of the accumulation device. At least one of the sensors is arranged to give a signal when the first rotation position is reached, which signal triggers the driving unit to start pulling the material to be granulated. Further, at least one of the sensors is arranged to give a signal when the second rotation position is reached, which signal triggers the driving unit to stop pulling the material to be granulated. The first rotation position could be a position signifying that the accumulating device is in a least-accumulative position where the material to be granulated is more or less straight. The second position could be a position signifying that the accumulative device is in a most-accumulative position where the material to be granulated is bent more or less as much as possible. Hereby, material to be granulated can be fed into the granulator mill with a requested velocity which could be set irrespective of the velocity of incoming material to be granulated, and with no risk of pulling the material out of a production machine upstream of the granulator.

According to an embodiment, the feeding arrangement further comprises an in-feed device arranged to the body upstream of the accumulation device in the feeding direction. The in-feed device comprises a first bar or roller having an extension substantially perpendicular to the feeding direction, for supporting the substantially flat material to be granulated. The in-feed device aids in inserting a new material end into the feeding device of the granulator. Also, it supports and guides the material when being fed into the granulator by the driving unit.

According to an alternative, the in-feed device further has a second bar or roller having an extension substantially perpendicular to the feeding direction. The first and the second bars or rollers are arranged so that a gap is provided between them, for receiving the substantially flat material to be granulated. This alternative of the in-feed device has the function of a security measure in that it prevents devices thicker than the defined gap distance to enter the granulator. Further, in-feed device protects a user of the machine to get injured by moving parts of the machine. Still further, any details of the material to be granulated that may be thicker than the defined gap distance, such as remaining products produced in the manufacturing machine, could be compressed, i.e. crumbled up (at least if they are weak) so that they can pass between the bars or rollers of the in-feed device and further into the driving unit in a format that can be handled. A bent convex inbound surface of the first and the second bar or roller would facilitate such compressing as well as an embodiment where the first and second bar are rollers.

According to another aspect, a granulator is provided, comprising a feeding arrangement according to any of the embodiments of the above aspect, and a granulator mill arranged downstream of the feeding arrangement for receiving substantially flat material to be granulated in the granulator. The granulator mill comprises one or more rotatable knives for co-operation with one or more stationary knives in order to chop the substantially flat material into granulates.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 2:
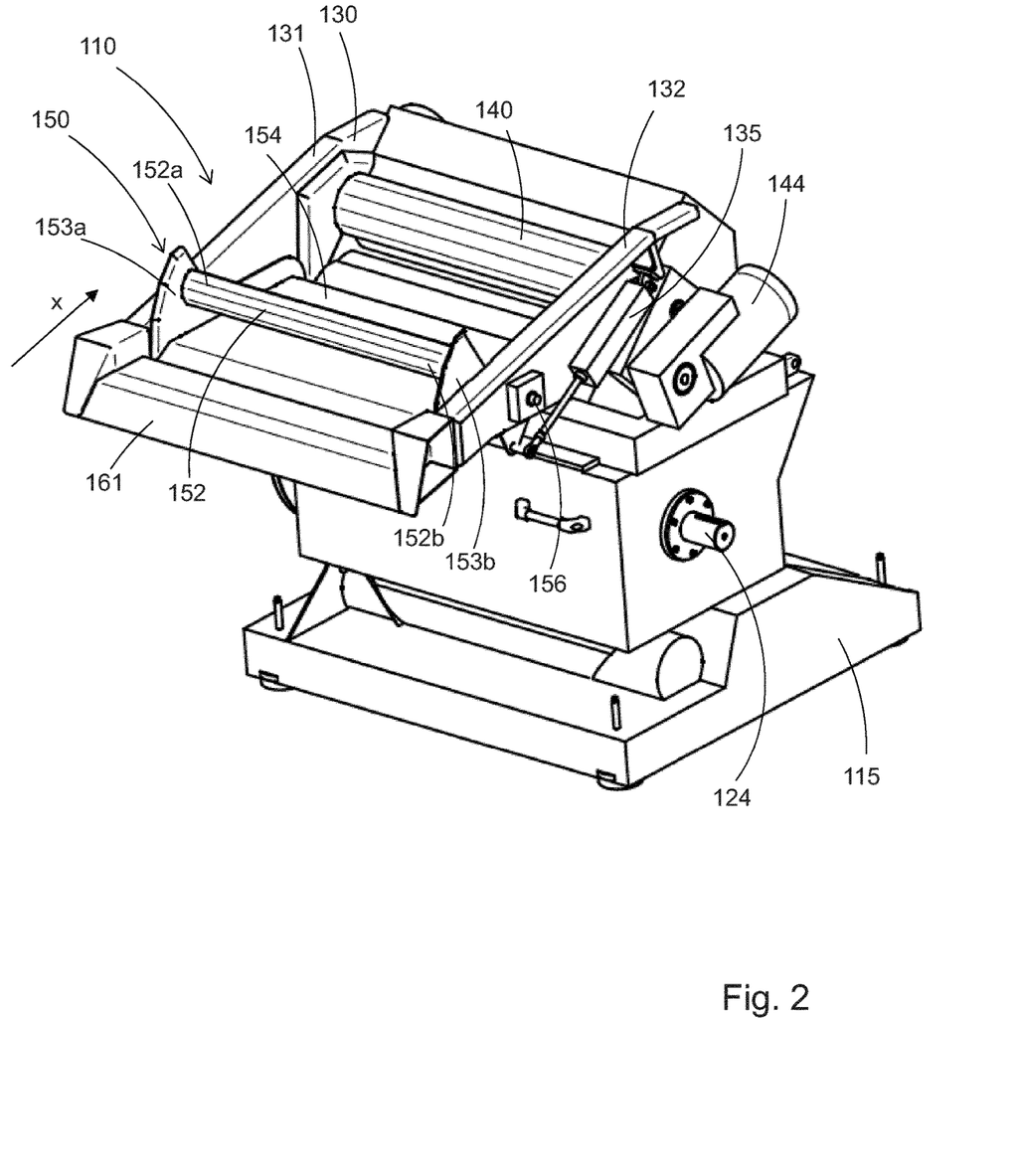
FIG. 2 is a perspective view of a granulator according to an embodiment with a feeding arrangement according to an embodiment.
Figure 3:
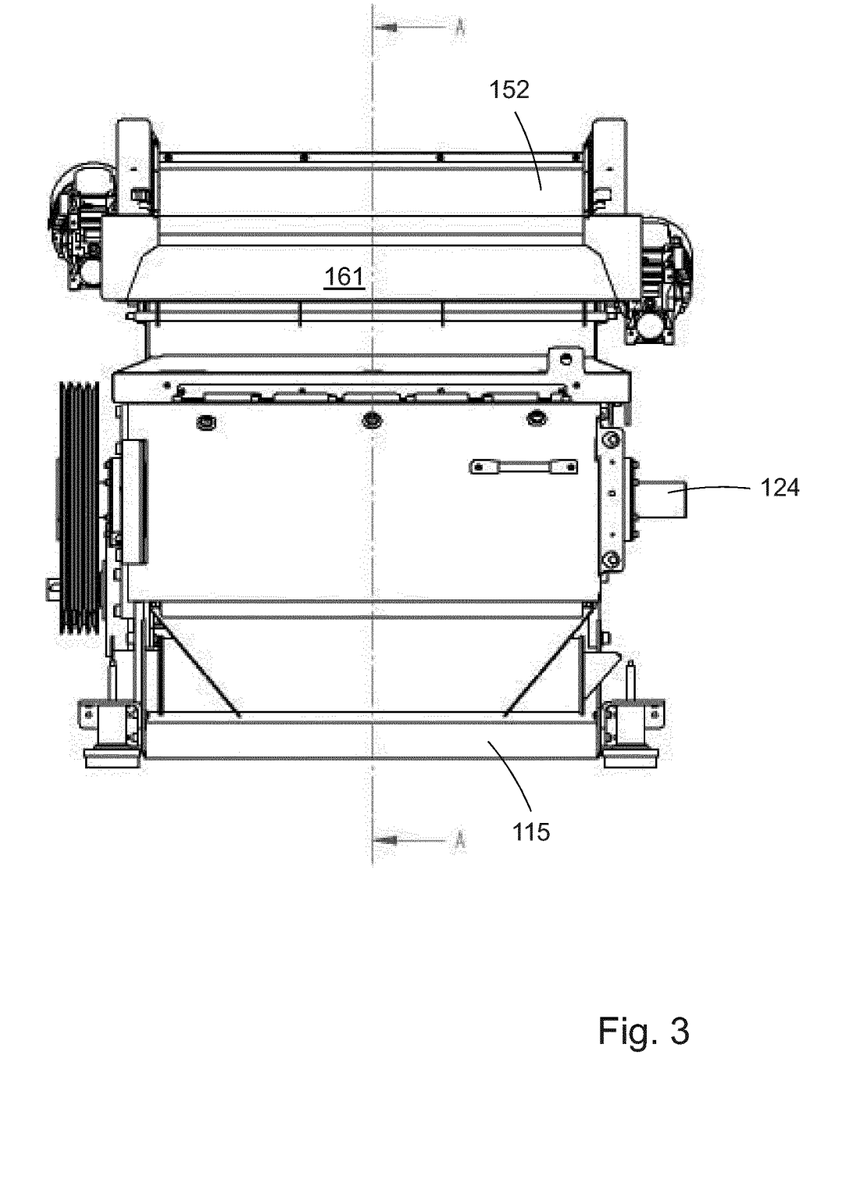
FIG. 3 is a front view of the granulator of FIG. 2.
Figure 4:
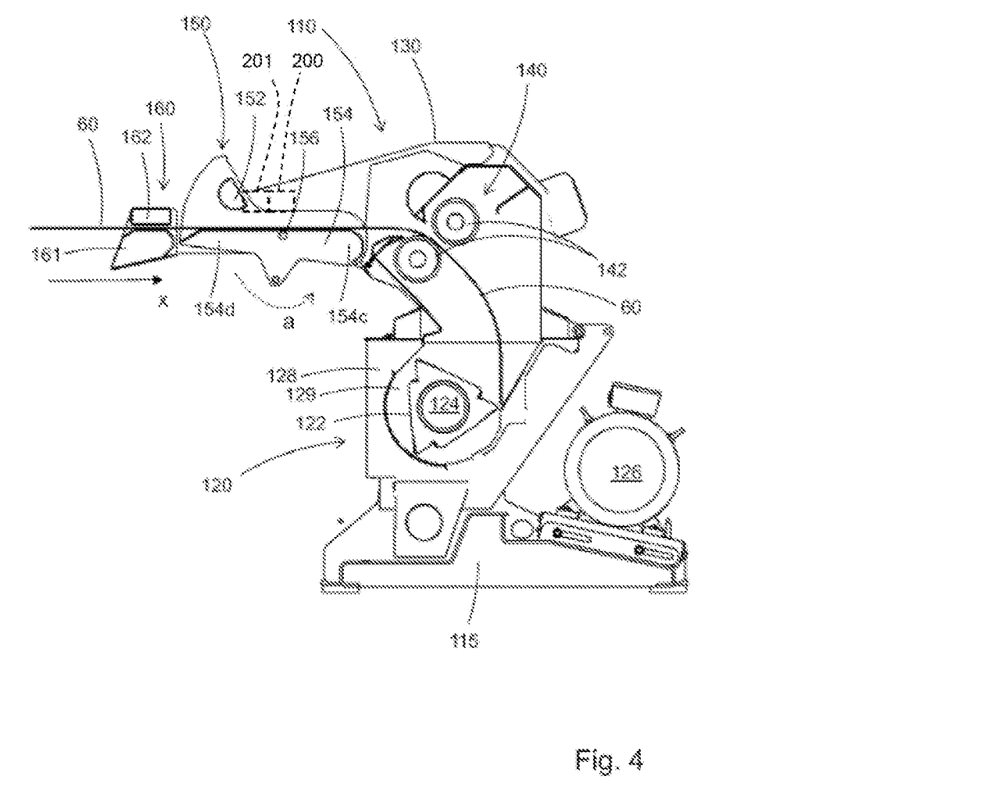
FIG. 4 is a cross-sectional side view of the granulator of FIGS. 2 and 3 taken from a cross-section A-A marked in FIG. 3, wherein an accumulation device according to an embodiment of the invention is in a first position.
Figure 5:
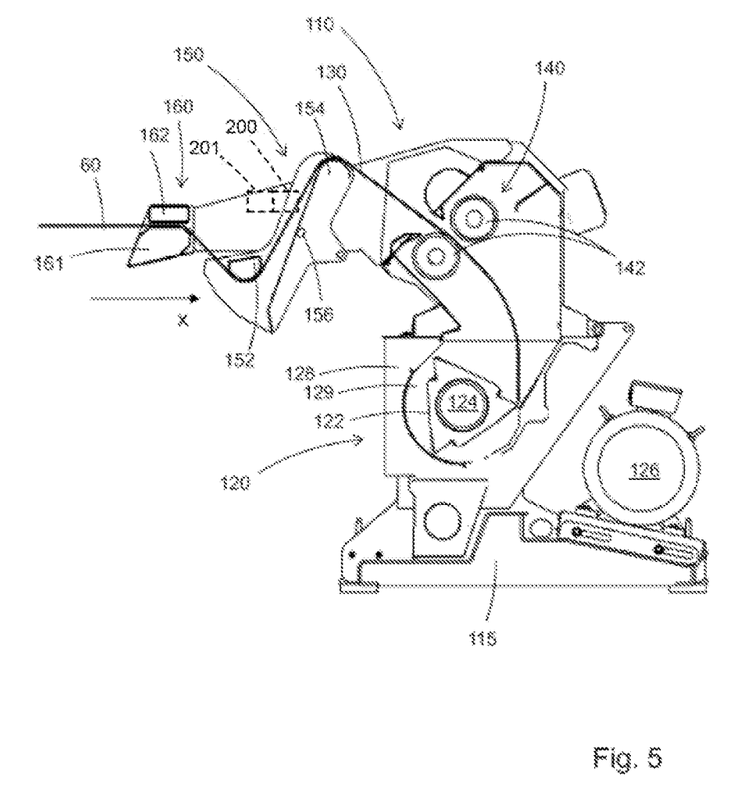
FIG. 5 is a cross-sectional side view of the granulator of FIGS. 2 and 3 taken from a cross-section A-A marked in FIG. 3, wherein the accumulation device according to an embodiment is in a second position.
Figure 6:
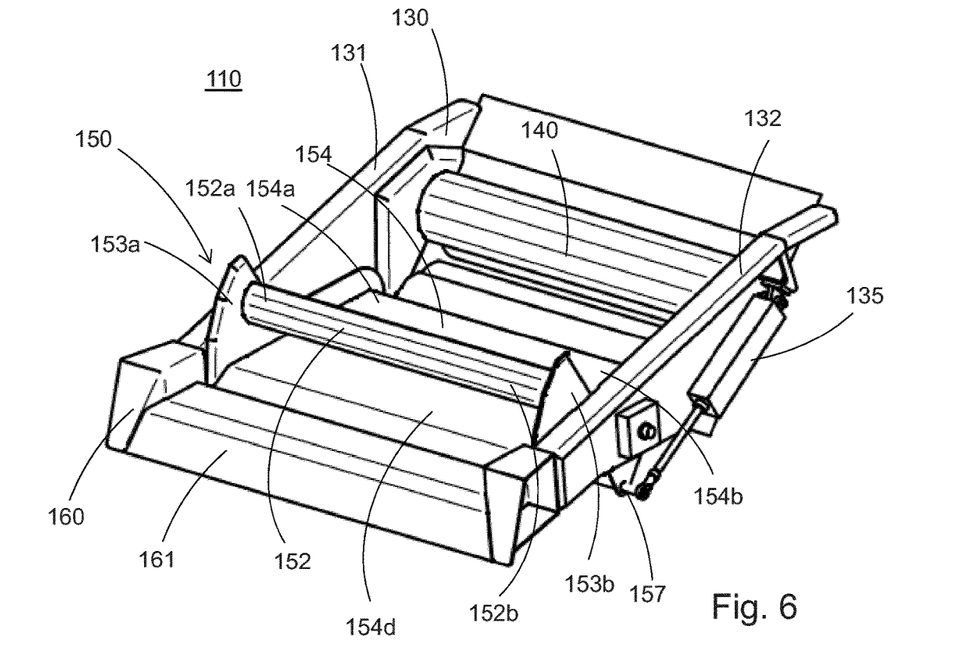
FIG. 6 is a perspective view of a feeding arrangement according to an embodiment.
Figure 7A:
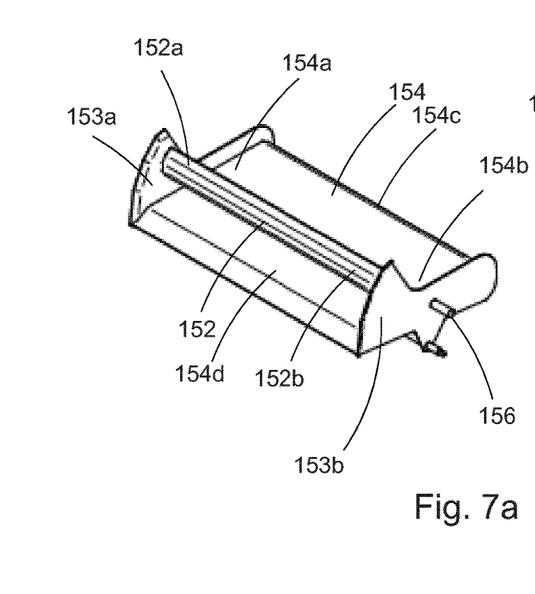
FIG. 7a is a perspective view of the accumulation device in the first, least accumulative position, according to an embodiment.
Figure 7B:
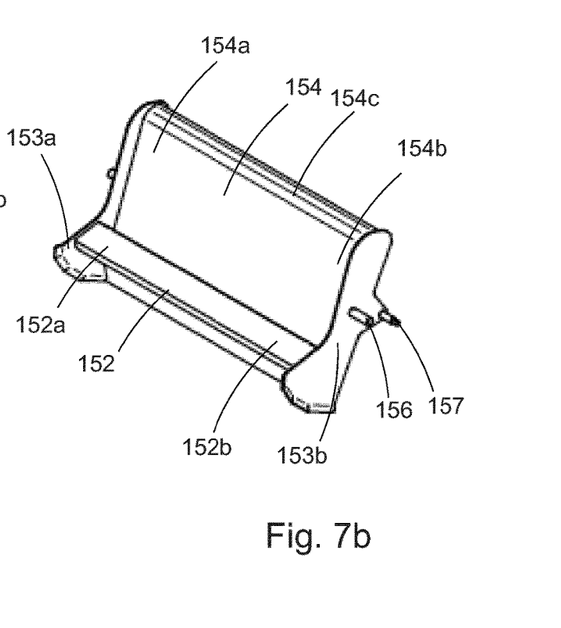
FIG. 7b is a perspective view of the accumulation device in the second, most accumulative position, according to an embodiment.

The FIGS. 2-5 show embodiments of a granulator comprising a feeding arrangement 110 according to embodiments of the invention and a granulator mill 120. FIG. 6 shows an embodiment of a feeding arrangement comprising an accumulation device. FIGS. 7a-7b describe embodiments of accumulation devices. The feeding arrangement 110 is arranged for feeding substantially flat material 60 to be granulated into the granulator mill 120, in which the substantially flat material is chopped into smaller pieces, so called granulates. FIGS. 4 and 5 show the granulator in a side view taken from a cross-section A-A, the cross section A-A being marked in the front view figure, FIG. 3.

The granulator mill 120 comprises a rotatable part 122 (see e.g. FIG. 4) onto which periphery a number of knives are positioned, in this example embodiment there are three knives. The granulator mill 120 further comprises a stationary part 128 providing an interior space 129 in which the rotatable part 122 is arranged. The rotatable part 122 has a rotatable shaft 124 which is driven to rotate by a mill motor 126. The stationary part 128 has a number of knives pointing towards the rotatable part 122. As the rotatable part 122 is rotated, the knives of the stationary part 128 co-operate with the knives of the rotatable part in order to chop the substantially flat material 60 into granulates. The granulator mill 120 and the mill motor 126 are arranged onto a base plate 115 arranged to be positioned on a floor.

The feeding arrangement 110 comprises a body 130, an accumulation device 150 according to an embodiment and a driving unit 140. The accumulation device 150 and the driving unit 140 are arranged to the body 130. The driving unit 140 is arranged for driving, or feeding, the substantially flat material 60 to be granulated in a feeding direction x, from the accumulation device 150 via the driving unit 140 and into the granulator mill 120. The body 130 has two substantially parallel long sides 131, 132 extending in the feeding direction x. The driving unit 140 comprises in this embodiment a pair of rollers 142 rotationally arranged to the body 130 and extending substantially perpendicular to the feeding direction x. A first side of the pair of rollers 142 is rotationally arranged in a first 131 of the parallel long sides of the body 130 and an opposite side of the pair of rollers 142 is rotationally arranged in the second side 132 of the parallel long sides of the body 130. The pair of rollers 142 receives the substantially flat material to be granulated between its rollers so that the material is in contact with both rollers. When the rollers 142 are rotated in opposite directions, the material is pulled in the feeding direction into the granulator mill 120. In this embodiment, the driving unit 140 is positioned above the granulator mill 120 so that the material 60 to be granulated falls into the granulator mill through gravitational force. However, other positions may apply. The pair of rollers 142 are driven to rotate in opposite directions by a driving motor 144. Even though the driving unit 140 is in this embodiment described as a pair of rollers, other realizations may apply.

The exemplary granulator further comprises an accumulation device 150 according to an embodiment. The accumulation device 150 is positioned upstream of the driving unit 140 in the feeding direction x, i.e. the material 60 to be granulated is received at the accumulation device and passes through the accumulation device 150 before it is received at the driving unit 140. The accumulation device 150 is rotationally attached to the body 130 via a shaft 156, also called a rotational shaft 156. The rotational shaft 156 is rotationally attached with one end to the first long side 131 of the body 130 and with its opposite end to the second long side 132 of the body 130. Further, the accumulation device 150 comprises a first side wall 153a and a second side wall 153b. The first and the second side walls 153a, 153b are parallel and extend in the feeding direction x.

Further, the accumulation device comprises a first guiding device 152 and a second guiding device 154 for guiding and deflecting the material 60 to be granulated. The first guiding device 152 and the second guiding device 154 both have an extension substantially perpendicular to the feeding direction x. The first guiding device 152 has a first end 152a arranged to the first side wall 153a of the accumulation device 150, and a second end 152b arranged to the second side wall 153b of the accumulation device 150. The second guiding device 154 has a first end 154a arranged to the first side wall 153a and a second end 154b arranged to the second side wall 153b of the accumulation device 150. In other words, the first and second guiding devices 152, 154 are connected to each other via the first and second side walls 153a, 153b so that when rotating the accumulation device 150 around the rotational axis provided by the shaft 156, both the first and the second guiding device 152, 154 are rotated around the rotational axis provided by the shaft 156. The first and the second guiding device 152, 154 extend substantially perpendicular to the first and the second side wall 153a, 153b. The first and the second side wall 153a, 153b function as guides for the material to be granulated, ensuring that the material is not moved aside the feeding direction.

Further, according to an embodiment, the first guiding device 152 may be a rod fixedly arranged to the side walls 153a, 153b or a roller rotatably arranged to the side walls 153a, 153b. According to the same or another embodiment, the second guiding device 154 has a first part 154c with a bent contact surface for deflecting the material to be granulated. The first part 154c is arranged downstream of the first guiding device 152 at a distance from the rotational shaft 156. The first part 154c extends substantially perpendicular to the feeding direction x between the side walls 153a, 153b. The first part 154c may be a rod or a roller.

According to one embodiment, the second guiding device further has a second part 154d firmly connected to the first part 154c. The first and second parts 154c, 154d may constitute one and the same plate. In this embodiment, the second part 154d provides a straight contact surface that in a direction parallel to the side walls 153a, 153b passes into the bent contact surface of the first part 154c. Such a straight contact surface that extends as well in a direction parallel to the extension of the side walls as perpendicular to this direction would function as a support, or floor, for the material 60 to be granulated when it is fed through the accumulation device 150.

Further, the second part 154d of the second guiding device 154 may be arranged with a distance to the first guiding device 152 that allows not only flat waste material to pass in between the first guiding device 152 and the second part 154d of the second guiding device 154 but also products from the manufacturing machine that has not been let loose from the remaining waste material in the manufacturing process. Hereby, such products remaining with the flat waste material will not be stuck in between the second part 154d of the second guiding device 154 and the first guiding device 152 but instead be pulled into the mill by the driving unit 140. Further, the straight contact surface of the second part 154d is when positioned horizontally an aid when inserting the flat material into the granulator before starting the granulator the first time for a new production or after an interruption. The straight contact surface guides the loose end of the flat material 60 to be granulated to the driving unit 140 so that the driving unit can get hold of and pull the material. The granulator may also have an adjustment means in shape of e.g. a wheel (not shown) arranged on the outside of the granulator which may be turned in order to position the accumulator device 150 so that the straight contact surface is in the horizontal position when inserting the material to be granulated. The wheel may be positioned on the rotational shaft 156 in order to rotate the accumulator 150 into the horizontal position. Further, the first guiding device 152 and the first part 154c of the second guiding device 154 are arranged on mutually opposite sides of the rotational shaft 156. By such an arrangement, the accumulation device may easily be balanced in order to achieve a well-balanced accumulation device 150 driven by gravitational force in order take on one of two rotational end-positions (see further below).

When the described embodiment of a granulator is in use, the flat material to be granulated is fed via the accumulation device 150 to the driving unit 140 and further into the granulation mill 120. When rotating the accumulation device 150 it may take on two end positions: a first end position shown in FIG. 4, which is the least accumulative position and a second end position shown in FIG. 5 which is the most accumulative position. When feeding the material 60 to be granulated into the granulator before starting the granulator, the accumulation device 150 is set in the first end position, e.g. using the mentioned wheel. In the first end position, the second part 154*d* of the second guiding device is in a horizontal position so that the material 60 to be granulated rests on the second part 154*d* and is guided by the second part 154*d* into the driving unit 140. The material 60 now takes on a straight form, going the shortest way through the accumulating device 150. As material is fed into the driving unit 140, the driving unit will be stopped, i.e. holding the material to be granulated. As material is started to be fed into the granulator from e.g. a production unit arranged before the granulator, the accumulation device 150 is driven to rotate counterclockwise (following arrow a in FIG. 4) towards the second end position (shown in FIG. 5). In other words, as the material 60 to be granulated is held still by the driving unit 140, the accumulation device 150 will start rotating counterclockwise following arrow a in FIG. 4. As the accumulation device starts rotating, the first guiding device 152 will be moved downwards, soon starting to touch and bend the material 60 to be granulated downwards. The rotating movement is adapted to the velocity of the incoming material 60. As the accumulating device rotates, the first part 154*c* of the second guiding device 154 will press the material 60 to be granulated upwards. Hereby, the material to be granulated will start taking on an S-shape. In other words, the accumulating device 150 will start accumulating material 60 to be granulated. In this example, as a first alternative, the material 60 to be granulated is fed so that is bears on the lower side of the first guiding device 152 and on the upper side of the second guiding device 154, when being accumulated. However, as a second alternative, the other way around may apply, i.e. on the upper side of the first guiding device 152 and then on the lower side of the second guiding device 154. Although, the first alternative has proven to be more favorable as the turning radius becomes larger than for the second alternative. A smaller turning radius is less favorable as the risk of the material to be granulated to crack or break increases. As the counterclockwise rotating movement continues, the longer the way for the material to be granulated to travel from coming into the accumulating device 150 to leaving the accumulating device. After reaching the second end position shown in FIG. 5, the driving unit 140 gets an instruction to start feeding the material to be granulated into the granulator mill 120. As long as the feeding velocity of the driving unit 140 is higher than the incoming feeding velocity from the production unit arranged before the granulator, the accumulating device 150 is driven to rotate back again clockwise towards the position of FIG. 4.

By balancing the position of the first guiding device 152 and the position of the second guiding device 154 in relation to the position of the rotational shaft 156 on the accumulating device 150 and/or by balancing weights of the accumulation device over the accumulation device length parallel to the side walls 153*a*, 153*b* in relation to the position of the rotational shaft 156, it is possible to have the accumulation device striving, due to the gravitational force, for the second position i.e. the position where it accumulates the most material, i.e. has the longest feeding distance. This means that in an unloaded condition, the accumulation device would have its most accumulative position. Alternatively, as shown in FIGS. 2 and 6, the feeding device 110 may be equipped with a pneumatic cylinder 135 that aids in the movement between the first and the second end position. The pneumatic cylinder is in the shown embodiment attached with one of its longitudinal ends to a fastening means 157. The pneumatic cylinder is driven by compressed air and is controlled depending on in which direction the movement is to be performed, and on the gravitational force. The pneumatic cylinder also facilitates keeping the accumulation device in the horizontal, least accumulative position when e.g. inserting a new end of flat material to be granulated. In an alternative, the controlled pneumatic cylinder may be a gas cylinder or any other type of controlled linear actuator.

The first and the second end positions of the accumulation device 150 may be sensed by e.g. position sensors. For example, when the accumulation device 150 reaches the second end position (FIG. 5), a position sensor 200 (shown in phantom in FIGS. 4 and 5) may send a signal triggering the driving unit 140 to starts driving (or pulling) the material to be granulated. As the material to be granulated is pulled, the pulling force in the material would rotate the accumulation device towards a less accumulative position. When the accumulation device 150 reaches its first end position, this position could be sensed by e.g. another position sensor 201 (shown in phantom in FIGS. 4 and 5 and this information could be sent to the driving unit 140 that triggers the driving unit to stop pulling the material to be granulated. The granulator, e.g. the feeding device may have a control unit (not shown) that controls the start and stop of the driving device or, consequently, its motor based on the sensed positions.

There may also be sensors sensing the velocity of the incoming material 60 to be granulated. Alternatively, the information of the incoming velocity may be fed to the control unit of the granulator.

According to an embodiment, the feeding arrangement 110 comprises an in-feed device 160 arranged to the body 130 upstream of the accumulation device 150 in the feeding direction x. The in-feed device 160 comprises for example a first bar 161 and a second bar 162 (see FIG. 4). Both bars have an extension substantially perpendicular to the feeding direction x. The first and the second bar 161, 162 may be arranged so that a gap is provided between them, for receiving the substantially flat material to be granulated. In FIGS. 2, 3 and 6, the second bar 162 has been taken away in order to better shown the accumulation device 150. Alternatively, the first and second bar 161, 162 may be rollers. In an embodiment, only the first, lower bar 161 is used. This first bar would function as a support for the material to be granulated and aid in inserting an end of a new material sheet into the feeding device of the granulator.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus to address each and every problem sought to be solved by the presently described concept, for it to be encompassed hereby. In the exemplary figures, a broken line generally signifies that the feature within the broken line is optional.

The invention claimed is:

1. A feeding arrangement for a granulator, for feeding flat material to be granulated in a feeding direction into a granulator mill, the feeding arrangement comprising:
    a body,
    a driving unit arranged to the body, for pulling flat material to be granulated in the feeding direction into the granulator gill, and
    an accumulation device for accumulating flat material to be granulated the granulator mill, arranged upstream of the driving unit so that flat material to be granulated is to be fed from the accumulation device to the driving unit and further to the granulator mill, the accumulation device comprising:
    a first guiding device for guiding and deflecting material to be granulated, the first guiding device having an extension perpendicular to the feeding direction and, a second guiding device for guiding and deflecting material to be granulated, the second guiding device having an extension perpendicular to the feeding direction, at least a part of the second guiding device being arranged downstream of the first guiding device in the feeding direction, characterized in that the accumulation device further comprises:
    a rotational shaft extending perpendicular to the feeding direction, and arranged to connect the accumulation device to the feeding arrangement,
    wherein the first and the second guiding device are fixedly arranged in relation to each other so that when the accumulation device is rotated, the first guiding device as well as the second guiding device are rotated around the rotational shaft, the accumulation device being connected to the body via the rotational shaft, wherein the feeding arrangement further comprises one or more position sensors for sensing a first rotation position of the accumulation device and for sensing a second rotation position of the accumulation device, at least one of the one or more position sensors being arranged to give a signal when the first rotation position reached, which signal triggers the driving unit to start pulling the material to be granulated, and at least one of the one or more position sensors being arranged to give a signal when the second rotation position is reached, which signal triggers the driving unit to stop pulling the material to be granulated.

2. Feeding arrangement according to claim 1, further comprising:
    an in-feed device arranged to the body upstream of the accumulation device in the feeding direction, the in-feed device comprising a first bar or roller having an extension perpendicular to the feeding direction for supporting the flat material to be granulated.

3. Feeding arrangement according to claim 2, wherein the in-feed device further comprises a second bar or roller having an extension perpendicular to the feeding direction, the first bar and the second bar being arranged so that a gap is provided between them for receiving the flat material to be granulated.

4. Feeding arrangement according to claim 1, wherein the second guiding, device has a first part with a bent contact surface for deflecting the material to be granulated, the first part being arranged downstream of the first guiding device at a distance from the rotational shaft, the first part extending perpendicular to the feeding direction.

5. Feeding arrangement according to claim 4, wherein the first guiding device and the first part of the second guiding device are arranged on mutually opposite sides of the rotational shaft.

6. Feeding arrangement according to claim 4, wherein the second guiding device further has a second part with a straight contact surface that in the feeding direction passes into the first part with the bent contact surface.

7. Feeding arrangement according to claim 1, wherein the first guiding device comprises a bar or roller extending perpendicular to the feeding direction.

8. Feeding arrangement according to claim 7, wherein the first guiding device is a bar having an approximately semi-circular cross-section, wherein the bent surface of the semi-circular cross-section is positioned so that it is a contact surface for the material to be granulated.

9. Feeding arrangement according to claim 1, further comprising a first side wall and a second side wall, the first and second side wall being parallel and extending in the feeding direction, and wherein the first guiding device has a first end arranged to the first side wall and a second end arranged to the second side wall, and the second guiding device has a first end arranged to the first side wall and a second end arranged to the second side wall.

10. Granulator comprising a feeding arrangement according to claim 1, and a granulator mill arranged downstream of the feeding arrangement for receiving flat material to be granulated in the granulator, the granulator mill comprising one Or more rotatable knives for co-operation with one or more stationary knives in order to chop the flat material into granulates.

* * * * *